(No Model.)
J. F. IVARSON.
TRIPOD HEAD.
No. 508,319. Patented Nov. 7, 1893.
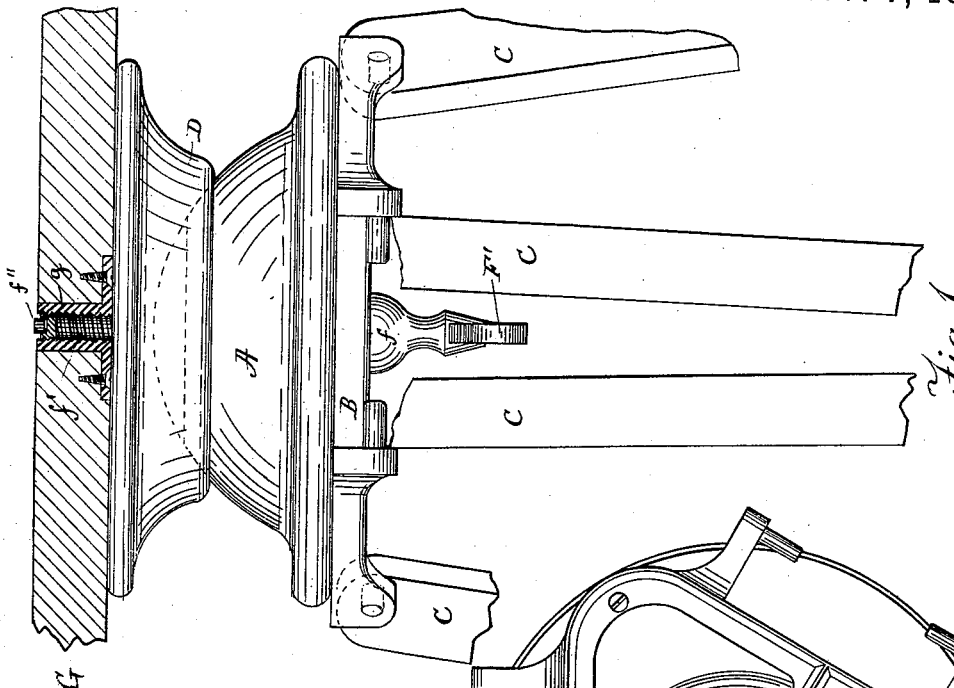
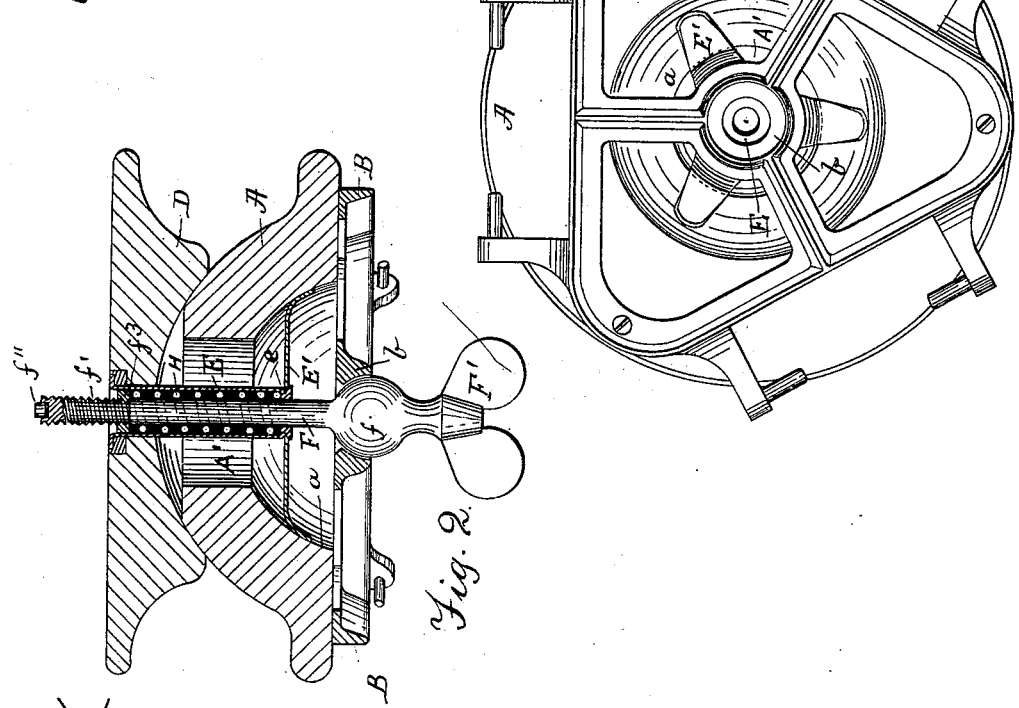
WITNESSES
Irving H Fay.
Alice A. Perkins.
INVENTOR
John F. Ivarson
by Alban Andrén his
ATT'Y
THE NATIONAL LITHOGRAPHING COMPANY,
WASHINGTON, D. C.

UNITED STATES PATENT OFFICE.

JOHN F. IVARSON, OF BOSTON, MASSACHUSETTS.

TRIPOD-HEAD.

SPECIFICATION forming part of Letters Patent No. 508,319, dated November 7, 1893.

Application filed December 24, 1892. Serial No. 456,213. (No model.)

*To all whom it may concern:*

Be it known that I, JOHN F. IVARSON, a subject of the King of Sweden and Norway, and a resident of Boston, in the county of Suffolk and State of Massachusetts, have invented new and useful Improvements in Tripod-Heads, of which the following, taken in connection with the accompanying drawings, is a specification.

This invention relates to improvements in tripod heads particularly adapted for the support of photographic cameras, surveying instruments and similar apparatus for the purpose of enabling the camera, &c., to be readily adjusted in position without the need of changing the position of the tripod legs as will hereinafter be more fully shown and described, reference being had to the accompanying drawings, wherein—

Figure 1 represents a side elevation of the invention. Fig. 2 represents a central longitudinal section; and Fig. 3 represents a bottom plan view showing the clamping screw as removed.

Similar letters refer to similar parts wherever they occur on the different parts of the drawings.

The device consists of a sphero-convex body or block A preferably secured to the tripod leg support B, to which the legs C, C, C, are pivoted in any suitable or well known manner. In practice I prefer to make the block A of wood or fiber and the piece B of metal and secure the latter to the said block A by screws or other suitable means, but this is not essential as if so desired the block A may be made of metal and secured to or made in one piece with the part B without departing from the essence of my invention. Upon the convex block, or ball piece A is the adjustable socket D, the concave under side of which is made to fit the upper surface of the block A as shown in Fig. 2. The block A has an inverted cup shaped recess $a$ on its under side, and is also provided with a central perforation A' as fully shown in Fig. 2; to the socket D is secured in a suitable manner the metal sleeve E which passes loosely through the perforation A' in the ball piece A and has attached to its lower end a spring plate E' adapted to bear with a proper friction against the top of the recess $a$ by which arrangement the parts A and D are adjustably held together with a proper frictional resistance.

F is the clamping bolt having near its lower end a ball $f$ adapted to fit or rest in a hemispherical bearing socket $b$ in the leg support B. The lower end of the clamping bolt F terminates as a thumb piece F' by means of which said bolt can be manipulated. The upper end of the bolt F is screw threaded as shown at $f'$ and is long enough to project above the upper surface of the socket D so as to permit of its being screwed into the nut $g$ of the camera—or instrument-base G, whenever it is desired to connect such camera or instrument to the tripod head.

In practice I prefer to provide the upper end of the screw $f'$ with a rubber or elastic bunter $f''$ for the purpose of preventing the scratching or defacement of the under side of the camera or instrument while in the act of placing such camera or instrument in position for securing it to the screw $f'$.

For the purpose of retaining the bolt F in position within the sleeve E when not attached to a camera or other instrument, I prefer to attach to the said bolt near its upper end, a nut or washer $f^3$ between which and an inwardly projecting lip $e$, in the lower end of the sleeve E is located a coiled spring H as fully shown in Fig. 2. By this arrangement the bolt F is held with a yielding pressure upward, that is, the ball $f$ on it is normally held against the bearing $b$ when the camera or other instrument is not attached to the tripod head.

In attaching the desired instrument to the tripod head it is only necessary to place said instrument on the top of the socket D causing the bolt F to be depressed against the influence of its spring H when the instrument may readily be adjusted in position until its nut $g$ comes opposite to the clamping bolt; by turning the thumb piece F' and causing its screw $f'$ to engage in the nut $g$ the camera, &c., may be readily secured to the parts D, A, B. By slightly loosening the bolt F the camera and the part D can easily be tipped or adjusted to any desired inclination or swung to the right or left, more or less as may be desired for the purpose of pointing it to the desired object. After being properly adjusted, the camera is secured firmly in position simply by tightening the clamping bolt F.

The camera is detached from the tripod head simply by unscrewing the fastening bolt F and in so doing the latter is caused to descend against the influence of the spring H thus permitting the camera base G to rest upon the socket piece D until the screw $f'$ is entirely detached from the nut $g$. When the camera is removed from the tripod head, the bolt F will automatically assume the position shown in Fig. 2 by the influence of the spring H.

Having thus fully described the nature, construction, and operation of my invention, I wish to secure by Letters Patent and claim—

1. A tripod head, consisting of a socket D, a convex block A fitting the socket and having a recess $a$, a sleeve E secured to the socket and extending into the recess in the block, a plate E' secured to the sleeve and bearing against the wall of the recess in the block, a base B secured to the block and having a center bearing socket $b$, a clamping bolt F extending through the block and socket to engage a camera, or other object, and provided with a ball $f$ fitting the center socket in the said base, and a spring arranged in the sleeve and acting on the clamping bolt to permit the latter to yield longitudinally, substantially as described.

2. A tripod head, consisting of a socket D, a block A having a recess $a$ and a convex portion fitting the said socket, a base B secured to the block and having a center socket bearing $b$, and a longitudinally spring yielding clamping bolt F extending through the socket and block to engage a camera, or other object, and provided with a ball $f$ fitting the center socket bearing of the said base, substantially as described.

In testimony whereof I have signed my name to this specification, in the presence of two subscribing witnesses, on this 17th day of December, A. D. 1892.

JOHN F. IVARSON.

Witnesses:
ALBAN ANDRÉN,
LAURITZ N. MILLER.